US009242550B2

(12) United States Patent
Thompson et al.

(10) Patent No.: US 9,242,550 B2
(45) Date of Patent: Jan. 26, 2016

(54) PROCESS FOR REINFORCING A RIGID PLASTIC FUEL TANK

(75) Inventors: James Edward Thompson, Novi, MI (US); David Hill, Commerce Township, MI (US); Bjorn Criel, Sint-Martens-Lennik (BE); Vincent Cuvelier, Brussels (BE); Jules-Joseph Van Schaftingen, Wavre (BE)

(73) Assignee: INERGY AUTOMOTIVE SYSTEMS RESEARCH (Société Anonyme), Bruxelles (BE)

( * ) Notice: Subject to any disclaimer, the term of this patent is extended or adjusted under 35 U.S.C. 154(b) by 799 days.

(21) Appl. No.: 13/377,625

(22) PCT Filed: Jun. 9, 2010

(86) PCT No.: PCT/EP2010/058075
§ 371 (c)(1),
(2), (4) Date: Dec. 12, 2011

(87) PCT Pub. No.: WO2010/145976
PCT Pub. Date: Dec. 23, 2010

(65) Prior Publication Data
US 2012/0097318 A1 Apr. 26, 2012

Related U.S. Application Data

(60) Provisional application No. 61/187,106, filed on Jun. 15, 2009.

(30) Foreign Application Priority Data

Jul. 6, 2009 (EP) .................................... 09164677

(51) Int. Cl.
*B60K 15/067* (2006.01)
*B60K 15/03* (2006.01)

(52) U.S. Cl.
CPC ......... *B60K 15/03177* (2013.01); *B60K 15/067* (2013.01); *Y10T 156/10* (2013.01)

(58) Field of Classification Search
CPC .............................. B65B 7/30; B65D 11/1833
USPC .............. 220/6, 666, 560.07, 4.28, 905, 86.5, 220/601, 62.11; 244/135 B
See application file for complete search history.

(56) References Cited

U.S. PATENT DOCUMENTS 3,596,794 A 8/1971 Peters
4,214,721 A * 7/1980 Burhans et al. ........... 244/135 B
(Continued)

FOREIGN PATENT DOCUMENTS

CN 1496883 A 5/2004
GB 2430183 A 3/2007
(Continued)

OTHER PUBLICATIONS

Russian Office Action issued Mar. 4, 2014, in Russia Patent Application No. 2012101320 (with English translation).
(Continued)

*Primary Examiner* — Richard Chang
(74) *Attorney, Agent, or Firm* — Oblon, McClelland, Maier & Neustadt, L.L.P.

(57) ABSTRACT

Process for reinforcing a plastic fuel tank comprising a wall defining an internal closed volume, according to which a structural member is fixed to the wall of the tank outside the closed volume, in at least two points being located in two different portions of said wall where a deflection induced when the tank is filled with fuel, is low; and said structure having at least one contact point with the tank wall in a portion of said wall where the deflection is high.

7 Claims, 6 Drawing Sheets

(56) References Cited

U.S. PATENT DOCUMENTS

| | | | |
|---|---|---|---|
| 4,886,180 A * | 12/1989 | Bonczyk | 220/646 |
| 2001/0013165 A1 | 8/2001 | Hansen et al. | |
| 2003/0198506 A1 | 10/2003 | Yonezawa | |
| 2007/0246929 A1 | 10/2007 | Isayama et al. | |

FOREIGN PATENT DOCUMENTS

| | | |
|---|---|---|
| JP | 50-7281 | 7/1970 |
| JP | 58-192122 U | 12/1983 |
| JP | 2000-18487 | 1/2000 |
| JP | 20020339400 A | 11/2002 |
| JP | 20040203094 A | 7/2004 |
| JP | 20060001381 A | 1/2006 |
| JP | 20070177761 A | 7/2007 |
| JP | 2008-37230 | 2/2008 |
| RU | 49 762 U1 | 12/2005 |
| RU | 2 334 624 C2 | 4/2008 |
| WO | WO 2006/009049 A1 | 1/2006 |
| WO | WO 2010122065 A1 | 10/2010 |
| WO | WO 2011110519 A1 | 9/2011 |

OTHER PUBLICATIONS

Japanese Office Action issued Mar. 10, 2014, in Japan Patent Application No. 2012-515431 (with English translation).

Peiyong Qin, et al—"CAE Fatigue Prediction of Fuel Tank Straps using Proving Ground Loads" (SP-1958), SAE 100 Technical Paper Series, Paper No. 2005-01-1405, DOI: 10.4271/2005-01-1405; 7 pgs.

Combined Chinese Office Action and Search Report issued Aug. 5, 2014 in Patent Application No. 201080026495.5 with English Translation of Category of Cited Documents.

Office Action issued on Jul. 1, 2014 in the corresponding Russia Patent Application No. 2012101320/11(001819) (with English Translation).

\* cited by examiner

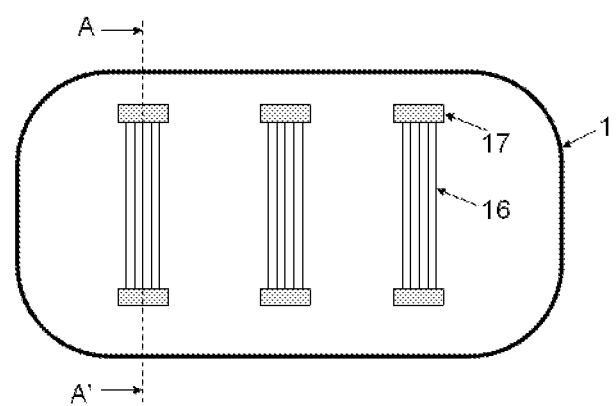
Fig 8a
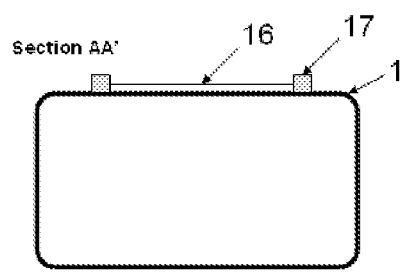 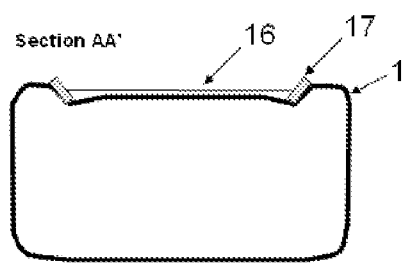
Fig. 8b　　　　　　　　　Fig 8c

PROCESS FOR REINFORCING A RIGID PLASTIC FUEL TANK

CROSS-REFERENCE TO RELATED APPLICATIONS

This application is a U.S. national stage entry under 35 U.S.C. §371 of International Application No. PCT/EP2010/058075 filed Jun. 9, 2010, which claims priority to U.S. Application No. 61/187,106 filed on Jun. 15, 2009 and European Application No. 09164677.8 filed on Jul. 6, 2009, the whole content of these applications being herein incorporated by reference for all purposes.

TECHNICAL FIELD OF THE INVENTION

The present invention relates to a process for reinforcing a rigid plastic fuel tank. Recently, a new category of vehicle has been introduced to the market, which uses both electricity and internal combustion to propel itself. This group of vehicles has been called "hybrid" vehicles. Although these vehicles make up only a small portion of the global automotive market, their market share increases each year. In recent months a new derivation of the hybrid vehicle has been introduced that uses electricity only for the first 40-60 miles of a given journey assuming the vehicle was plugged into electrical power for a predetermined amount of time before the journey. These vehicles are deemed "plug in hybrids".

BACKGROUND

Typically, fuel vapors are generated inside of the fuel tank due to temperature and fuel movement and are stored in a charcoal canister to prevent evaporative emissions of hydrocarbons into the atmosphere. These vapors are periodically purged out of the canister and sent to the engine where they are consumed during the normal combustion process. On a standard gasoline engine vehicle this can occur whenever required to prevent the canister from becoming stuffed and bleeding hydrocarbons into the environment. However, this cannot occur on a hybrid vehicle when it is operating in electric mode. A "plug in hybrid" vehicle may go many driving cycles without ever running the gasoline engine. Therefore, there becomes a need for the fuel system to contain vapor for long periods of time by keeping the system sealed and under pressure in order to limit fuel evaporation. At elevated temperatures, the pressure build inside of the tank will be substantially higher than a conventional fuel system.

Currently, some solutions have been provided to the problem, which are namely:
1. To replace the current polymer tank with a steel equivalent capable of holding the pressure.
2. To optimize the tank shape for instance by providing tack-offs (also called "kiss points"), where during the molding of the tank, the top and bottom are dimpled to create a mechanical link between the two.
3. To use (generally metallic) straps as reinforcement.
4. To mold or mechanically lock into the tank surface, structural ribs which create additional rigidity.
5. To use a plastic bladder inside of a steel tank to control vapor generation and associated pressure.

However, each of these solutions has at least one drawback:
1. A metallic tank has a significant weight penalty over a polymer tank based on the properties of material density. The density of steel is ~8 times higher than that of HDPE while conventionally tank walls are only 3-4 times thicker than steel tank equivalents. It is also cost prohibitive to make a small volume of steel tanks, due to the high cost of the stamping dies. The alternative is to make the conventional vehicle volume in steel as well, resulting in a potential degradation in corporate average fuel economy that offsets the gains made by the small volume of plug-in hybrids.
2. Shape optimization can only add so much additional pressure resistance while maintaining the properties required by the vehicle manufacturer. Tack-offs for example use a significant amount of available volume in the tank due to their inherent shape. They also reduce the impact resistance of the tanks And most of the time, they will not by themselves provide the required pressure resistance.
3. Strap reinforcement can be achieved but it can be difficult to manage as the underbody of a vehicle has complex shapes, and clearances to the underbody and ground are strictly enforced by the manufacturer. In addition, as straps are added, the additional weight of the straps begins to negate the weight savings of the polymer tank. Additionally, as the straps are generally not laminated to the tank surface, they do not offer significant structural advantages.
4. Solutions that are molded or mechanically locked to the tank surface are generally inserted prior to cooling of the tank, resulting in molded in stresses in the tank shell that could be detrimental to the performance of the tank shell.
5. Integration of the flexible bladders has been industrialized for conventional plastic tanks, however such technology has been abandoned, due the problem of fixing and sealing the bladder inside of the tank.

SUMMARY

The present invention aims at solving these problems by providing a reinforcement solution for rigid plastic fuel tanks that allows them withstanding pressure without too much penalizing the weight of the tank or its impact resistance, that is easy to use in an industrial process, that does not induce internal stresses in the tank and that enables using the same tank for a complete platform (knowing that hybrid vehicles only constitute a small portion of a given platform).

To that end, the present invention concerns a process for reinforcing a rigid plastic fuel tank comprising a wall defining an internal closed volume, according to which a structural member is fixed to the wall of the tank outside the closed volume, in at least two points being located in two different portions of said wall where a deflection induced when the tank is filled with fuel, is low; and said structure having at least one contact point with the tank wall in a portion of said wall where the deflection is high.

More specifically, the present invention relates to a process as set forth above, comprising the following steps:
identifying at least one high deflection portion and at least two low deflection portions on the tank wall;
mechanically linking these at least three portions outside the closed volume with the rigid structural member in a way such that said structural member has at least one contact point with the tank wall in at least one point of the high deflection portion, and at least one fixation point on the tank wall in each of the at least two low deflection portions, these contact and fixation points not being aligned but defining a plane.

BRIEF DESCRIPTION OF THE DRAWINGS

For a detailed description, reference will now be made to the accompanying drawings, in which:

FIGS. 8a, 8b, and 8c relate to various views of an alternative embodiment to the present invention in which several structural members are used.

DETAILED DESCRIPTION

Figure 1:
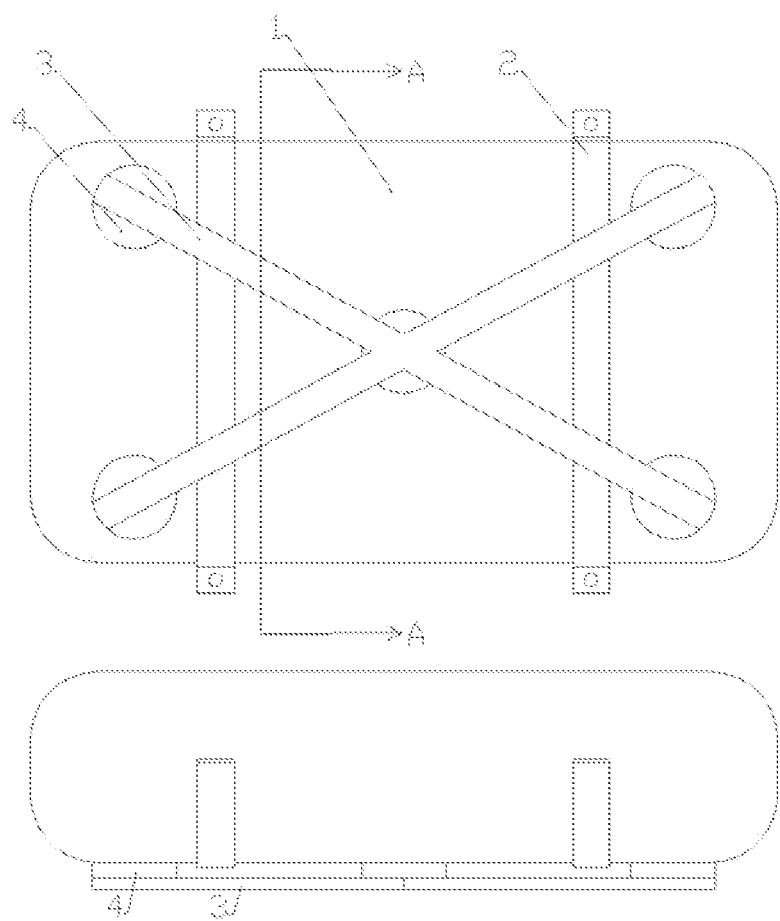
FIGS. 1 to 3 relate to embodiments of the invention in which the structural member is welded to the tank.

The concept of attaching a structural member to the wall of a finished (molded and cooled down) rigid plastic tank at multiple fixation/contact points allows for better flexibility in manufacturing and mitigates any molded in stresses that would exist if the structure was inserted into the mold and welded or mechanically attached to the tank surface prior to the cooling of the tank. The fact that these points are not aligned but on the contrary, define a plane in space, allows for the transfer of deflection producing loads directly to portions of the tank that can manage the deflection, rather than to a strap that would transfer the load to the vehicle chassis, or a mechanically attached rib that could potentially move relative to the tank shell based on its properties.

By "point" should be understood in the frame of the invention, a small surface in fact (from up to several mm$^2$ to several cm$^2$), said small surfaces being included respectively in high and low deflection parts of the tank.

The major functional differences between the solution of the invention and those of prior art are the following:
1. The solution is an "add on" to an existing tank, unlike the use of a steel tank.
2. This solution carries the load of the tank deflection independently unlike the use of additional straps that mount to the vehicle mounting points.
3. The system can be designed to provide optimized results in crash situations, unlike the use of tack-offs, which tend to create large areas rigidity that are vulnerable to impact. This system can be optimized to hold the pressure in the tank, and isolate itself during crash merely by proper sizing of the weld pads.
4. The solution is not susceptible to shrinking in the tank shell during cooling of the tank.
5. This solution does not require any inserts in the blow mold shell, allowing for one tank shell design for different vehicle iterations (i.e., Gasoline, Hybrid, Plug-in hybrid etc.)
6. This solution can be manufactured from relatively low cost and light weight materials.
7. Its fixation to the tank can be done with well known and industrialized processes.

The results achieved by the solution are the following:
1. The ability to use a plastic fuel system for a Plug-in hybrid application while maintaining a weight advantage over a steel tank.
2. The ability to add or delete the structure from the tank based on the intended vehicle derivation
3. A support system that does not rely on the structural integrity of the underbody.

Hence, its main advantages are:
1. Weight savings
2. Fuel economy gains
3. Component cost savings
4. Tooling cost savings
5. Corrosion resistance
6. Easier implementations to the vehicle assembly line (platform).

As explained above, the fuel tank that can be reinforced by the process according to the invention is made of a plastic (i.e., its wall is principally made of plastic) and it is "rigid", i.e., it has a substantially fixed volume and shape, which does not preclude that some expansion is allowed under the action of pressure and/or weight of liquid contained in the tank, but this volume change should be limited to a few %.

The term "plastic" means any material comprising at least one synthetic resin polymer.

Any type of plastic may be suitable. Particularly suitable plastics belong to the category of thermoplastics.

In particular, it is possible to use polyolefins, thermoplastic polyesters, polyketones, polyamides and copolymers thereof. A blend of polymers or copolymers may also be used, similarly it is also possible to use a blend of polymeric materials with inorganic, organic and/or natural fillers such as, for example but in a non-limiting manner: carbon, salts and other inorganic derivatives, natural or polymeric fibers. It is also possible to use multilayer structures composed of stacked and joined layers comprising at least one of the polymers or copolymers described above.

One polymer that is often used is polyethylene. Excellent results have been obtained with high-density polyethylene (HDPE).

The wall of the tank may be composed of a single thermoplastic layer, or of two layers. One or more other possible additional layers may, advantageously, be composed of layers made of a barrier material to liquids and/or gases. Preferably, the nature and thickness of the barrier layer are chosen so as to minimize the permeability of liquids and gases in contact with the internal surface of the tank. Preferably, this layer is based on a barrier resin, that is to say a resin that is impermeable to the fuel such as, for example, EVOH (a partially hydrolyzed ethylene/vinyl acetate copolymer). Alternatively, the tank may be subjected to a surface treatment (fluorination or sulfonation) for the purpose of making it impermeable to the fuel.

The tank according to the invention preferably comprises an EVOH-based barrier layer located between the HDPE-based outer layers.

By "upper" and "lower" parts of the tank wall are designated later on in this specification, the walls that respectively are in the upper and the lower substantially horizontal position when the fuel tank is mounted on a vehicle, while still having a lateral portion of course. These parts are generally separated by a pinch or part that was pinched between the two prints of the mold. The present invention allows reinforcing not only the lower part of the tank, which can also easily be done using the above mentioned straps, but also: the upper part of the tank, which is advantageous especially in the case of tanks for hybrid vehicles.

The volume defined by these walls is closed, i.e., contains the fuel hermetically while allowing fuel, ventilation and electrical lines passing through it, placing and servicing of accessories inside of it etc.

The structural member used in the process according to the invention is an object that is sufficiently rigid to manage the stress of the pressure acting on the tank. It may be a plane structure, generally shaped as a plate (flat object, not necessarily plane: it may for instance be a shell), or it may be an assembly of bars, beams or the like building up some kind of frame. The latter is preferred since it generally allows to optimize the performance/weight ratio namely through the shape of said bars/beams sections. Alternatively, a shell with openings (like a kind of nest) may be used as well.

This structural member must not necessarily be made in one piece. It may for instance be made of 2 parts that can slide over both sides of the fuel tank and that can be fixed/removed from it independently. It may also be built as multiple, separate members (like frames having a "C" shape) that are linked together (at least 2 by 2) and fixed to the tank wall (for instance: to its pinch or to fixation ribs) so as to provide the at least 2 fixation points and the at least one contact point according to the invention. When said structural member is in several pieces, said pieces are preferably mechanically linked as will be defined below, in order for said member to actually act as reinforcement transferring load/pressure from portions of the tank which will undergo a high deformation, to parts which won't.

Said structural member may be in plastic (preferably the same or one which is compatible with the plastic making up the tank wall if said member is welded to it), although in most of the cases, a metal or another incompatible material will be preferred in order to get a higher modulus. Metals and fiber reinforced polyesters like SMC (Sheet Molding Compounds) give good results in that regard. Generally, these compounds are made of fiber reinforced polyester compositions.

According to the invention, the at least one contact point is in a portion where the deflection (deformation) in use (when the tank is filled) is high. Generally, such a portion is substantially located in the center of the lower or upper wall and/or in the center of a "free" portion thereof (for instance: the center of the upper wall of one pocket of a saddle tank). In any event, such a location is easy to determine by a person of ordinary skill in the art, for instance by using software modeling tools and/or experiments, or merely based on his experience with tanks of similar shape. It is worth noting that the "contact" is preferably established at rest at the contact point, or alternatively, at a slight overpressure, the first embodiment being generally preferred.

Still according to the invention, the at least two fixation points are located in two different portions of the tank wall, where the deflection is low (compared to the one in the other, former portion). It is worth noting in that regard that the structural member may also be fixed to the tank wall at its contact point, which is in fact even preferred in some cases (where the tank can also be in vacuum conditions). By "fixation" is meant in fact a mechanical link (with rivets, nails, clips or the like), a weld, a glued portion or any other link which must be removed or destroyed in order to be able to remove the structural member from the tank wall at that point.

Preferably, the number and location of the fixation point(s) (in low deflection portion(s)) and of the contact point(s) (in high deflection portions) are as close as possible (considering practical limitations mainly owed to the geometry of the tank and its environment under the vehicle) to the points where the deflection is respectively the lowest and the highest on the tank wall. This can easily be determined by using software modeling tools and/or experiments as explained above.

According to a first embodiment of the invention, the structural member is welded to the tank wall at its fixation points, and preferably at its contact point(s) as well. The term "point" should then be considered as designating the welding area, i.e., a welding zone of a surface (interface between the tank wall and the structural member, where plastic molecules of both interact with each other after having been melted/fused together) which is broad enough to provide effective fixation and load (stress) transfer as explained above. Welding carries the advantage of being constrained to the tank in all axes. In that case, a preferred embodiment involves choosing for the structural member, a material which is more rigid that the plastic of the fuel tank and over molding its welding areas (fixation points) with a plastic as defined above (weldable to the tank wall) and/or fixing (for instance by means of a quick connect system) plastic welding feet to these points. Over molding is particularly easy from an industrial point of view (reducing the assembly steps).

This embodiment gives good results with a frame or with a plane, flat structural member which is welded to the bottom of the fuel tank. In practice, for tanks having a roughly rectangular section and which are fixed to the vehicle underbody, that would respectively be the middle and the 4 corners of the lower or upper tank wall. Hence, in a preferred embodiment, there are 5 welding points located respectively substantially in the middle and in the four corners of the lower or upper tank wall.

According to a second embodiment of the invention, the structural member is mechanically fixed to the tank. One way of doing this is by merely clipping (quick fastening) the member on the tank through the use of corresponding profiles on both parts.

Since most of the tanks are provided with a pinch (as defined above), it is convenient to give the structural member an appropriate shape and profile so that it can be clipped on the pinch. Hence, this embodiment gives good results with structural members shaped as half shells. SMC half shells give good results in that regard.

One drawback of this solution is however that molding tolerances are generally relatively high (i.e., dimensional accuracy is rather low) on plastic fuel tanks so that said clipping may sometimes not really be effective. To avoid that, one solution could be to use an equipment where clips are located at a fixed location and can be welded on the pinch at fixed location in space (relative to said equipment) so that clipping can occur on these clips instead of on the pinch itself. Alternatively, fixation parts (clips or other type) can be fixed on the tank bottom or lateral walls instead of on the pinch.

In this embodiment, the contact point(s) are preferably shaped as ribs (located on both parts: the tank and the structural member, and with a matching shape and size in order to effectively have contact between both parts), the geometry of which may be adapted in order to avoid entrapping fuel between 2 ribs (if they are located on the bottom) or to have a siphon in the venting lines (in the case the ribs are located on the upper wall). Spiral shapes can be advantageous in that regard.

Another way of mechanically fixing the structural member to the tank may be to use at least one kiss-point (i.e., one point where the upper and the lower tank walls are welded together), 2 flat members (plates) located on both sides of the kiss-point and linked together by some kind of rod (bar) passing through the kiss point. In that case, the contact points are in fact the contact surfaces between the flat members and tank upper and lower wall, and the fixation points are respectively on the upper and lower tank wall, where the kiss point is located.

The present invention also relates to a tank obtained by the process described above and to its use in a hybrid vehicle. Generally, for this purpose, the tank touches the underbody in several discrete places, leaving the rest of the upper tank surface unconstrained and similarly, straps touch the bottom of the tank over a small portion of the bottom surface.

In this embodiment, fixation straps may be constrained by the structural member during the fixation process and shipped to the manufacturer attached to the tank through the structural member. This reduces the number of components coming into the assembly plant.

Hence, the present invention also concerns a process for assembling a fuel tank on a (preferably hybrid) vehicle, comprising the following steps:

placing fixation straps over the bottom wall of the tank fixing a structural member to said bottom wall of the tank at multiple points as defined above and in a way such as to constrain (maintain in place, fix) the fixation straps so as to obtain an assembly with no moving parts attaching the assembly to the underbody of the vehicle by means of the fixation straps and eventually other assisting mechanical fixation means (rivets, screws . . . ).

Finally, it is worth noting that the present invention (particular external reinforcing member) may of course be combined with the solutions of prior art and namely: with internal reinforcements like those described above. In that regard, an interesting embodiment consists in combining the object of the present application with the one of co-pending application FR 09.52651 (the content of which is incorporated by reference in the present application), which relates to the use of internal hollow pillars having besides a reinforcing function, an active function within the fuel system/tank (ventilation, liquid/gas separation . . . ).

Further details of the present invention will be disclosed using FIGS. 1 to 7 attached, which should not be construed as limiting the scope of the invention to the embodiments they illustrate. FIG. 8 relates to an alternative to the present invention, which may be effective as well in reducing deflection in some cases.

Figure 2:
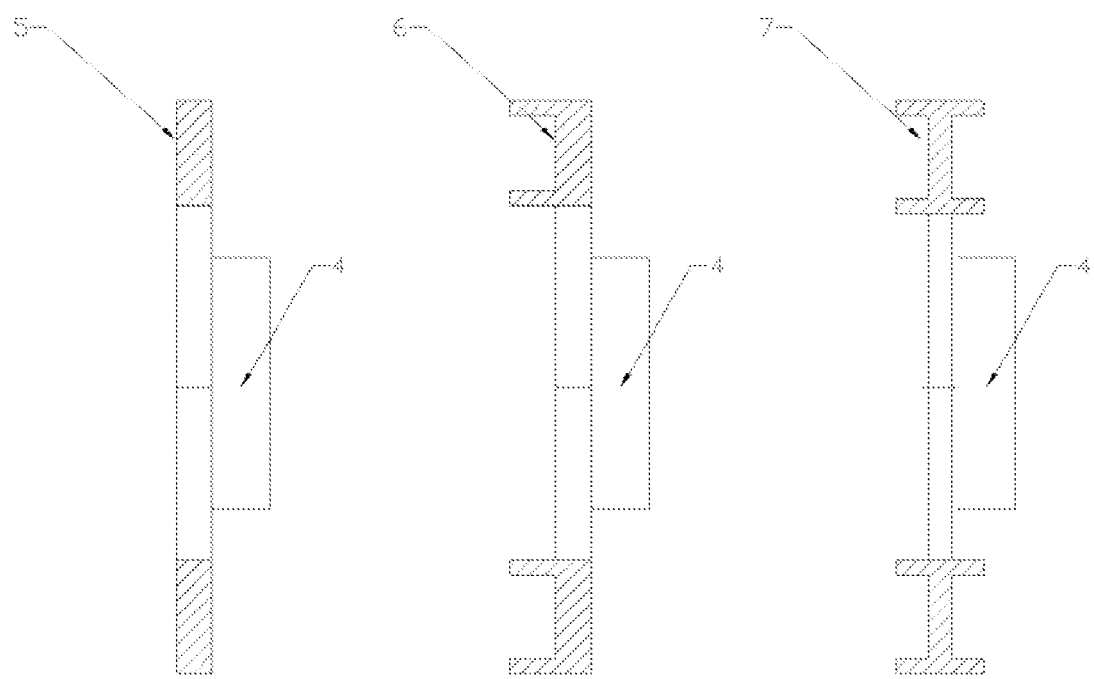
Figure 3:
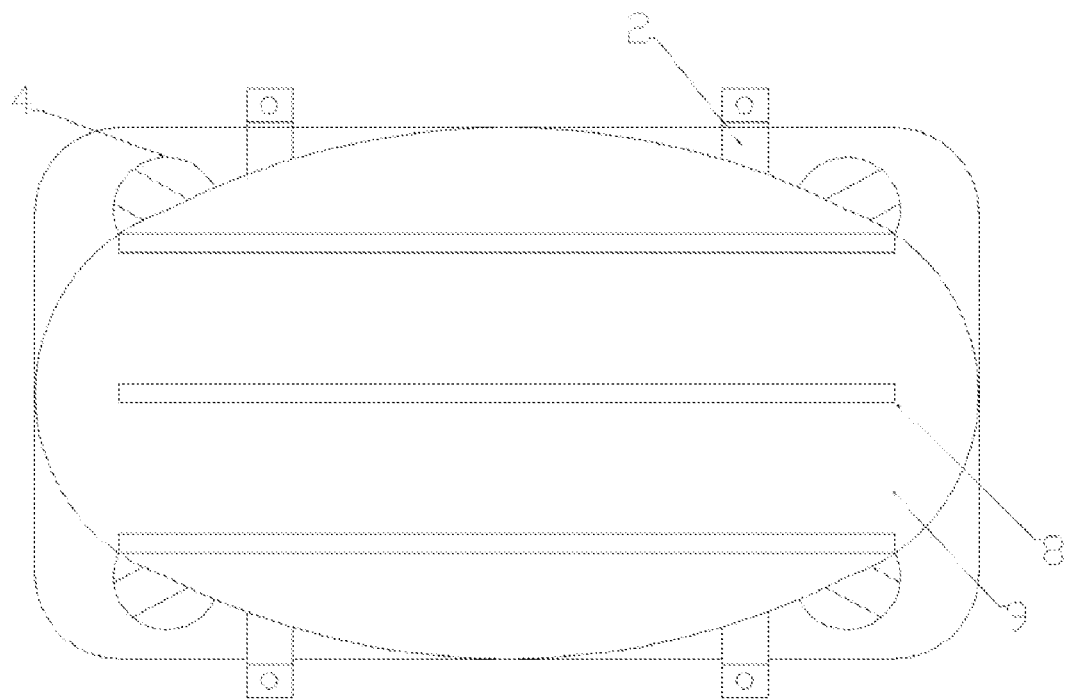

FIGS. 1 to 3 are related to an embodiment in which the structural member is welded to the tank; FIG. 1 shows both a bottom and side view of a tank (1) according to a preferred embodiment of the invention; FIG. 2 shows section A-A of FIG. 1; and FIG. 3 shows another sub-embodiment of the invention.

FIGS. 4 to 7 are related to different ways of performing another embodiment of the invention according to which the structural member is mechanically fixed to the tank wall.

FIG. 8 relates to an alternative to the present invention in which several structural members are used, which are not per se rigid but which enable to constrain deflection at the most critical parts of the tank (on the upper part thereof namely).

In the embodiment of FIGS. 1 to 3, straps (2) are used to constrain the tank (1) to the underbody of the vehicle. Generally speaking, the tank (1) touches the underbody in several discrete places, leaving the rest of the upper tank surface unconstrained. Similarly, the straps (2) touch the bottom of the tank (1) over a small portion of the bottom surface, and also, over a portion of its lateral wall (see the lower part of FIG. 1, i.e., the side view of the tank).

The structural member (3) which is shown in FIG. 1 is constructed of a material bearing a much higher stiffness than the tank shell (1). In this depiction, five HDPE feet (4) are over molded to the member (3) to allow its welding to the bottom surface of the tank (1). As a result, the member (3) serves to counteract the force of pressure on the tank shell (1) ultimately reducing the amount of deflection in the bottom of the tank (1) by transferring the load to the corners of the tank (1) where the load will then be in pure tension instead of bending in the center of the tank (1).

As explained above, an additional benefit that is realized is that the straps (2) can be constrained by the member (3) during the welding process and shipped to the manufacturer attached to the tank (1). This reduces the number of components coming into the assembly plant. This member (3) can be welded to the bottom and/or top of the tank as needed to reduce deflection caused by high vapor pressure.

FIG. 2 illustrates some of the different structural cross sections (5, 6, 7) that can be used to create the necessary stiffness to retain the tank bottom under pressure. In this figure, (5), (6) and (7) are cut sections of some of the preferred beam cross sections for managing the stress of the tank/structure. The non hashed area is the rest of the uncut portion of the structure.

FIG. 3 shows another embodiment in which the structural member (9) is continuous along the surface of the tank. In this case, the member (9) can be constructed of a glass fiber or carbon fiber composite to create optimum stiffness. If the stiffness of the member (9) is not sufficient, reinforcement bars (8) (for instance in metal) will be added to ensure proper stiffness. These bars (8) could be contours formed into the structure (9) or separate bars with profiles similar to those in FIG. 2.

Figure 4:
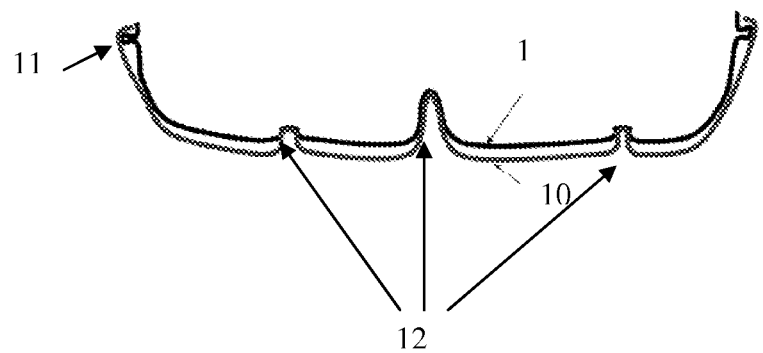
FIGS. 4 to 7 are related to different ways of performing another embodiment of the invention according to which the structural member is mechanically fixed to the tank wall.

In FIG. 4, an SMC half shell (11) is clipped on the pinch of a fuel tank (1)—of which only a section through the lower wall is pictured. The tank (1) and the half shell (11) comprise matching ribs which act as contact points.

Figure 5:
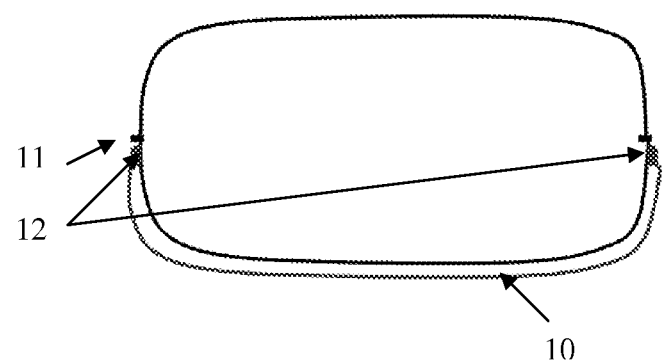

FIG. 5 shows a similar half shell (11) but this time fixed to fixation parts (12) which are over molded by the tank wall. The section illustrated is through a plane where there is no contact rib (in other words: this embodiment also uses ribs as contact points (areas) but they are not visible on the section illustrated).

Figure 6:
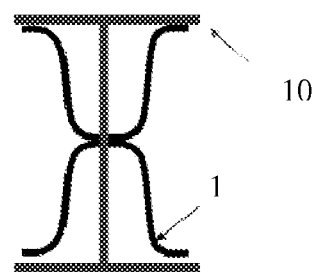

FIG. 6 shows the embodiment where a kiss point in the tank wall (1) is used to fix two flat SMC members which are joined and fixed to the tank (1) using a vertical bar.

Figure 7:
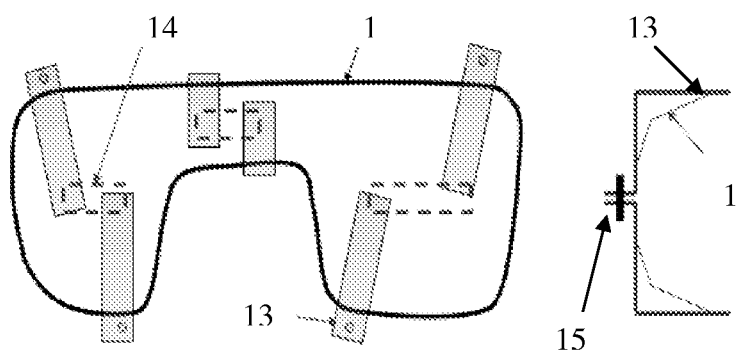

FIG. 7 shows (left: a view from above; and right: a partial vertical section) the embodiment using C-shaped frames (13) which are linked together using metallic links (14) and which are fixed to the tank (1) using fixation parts (15) which pass through the tank pinch.

FIG. 8 shows an alternative where glass or carbon fibers (16) are attached to two clips (17) welded on the tank surface, and where said fibers contact the tank wall (1) at least substantially in their middle. Preferably, said contact is established already when the tank is empty (not under pressure), or at least: when there is a slight overpressure in the tank.

A similar principle could be used internally in the tank in order to reduce deformation under vacuum conditions. On PHEV, the under pressure can go down to up to 150-200 mbar so that this would be a favorable embodiment.

Of course a combination of inside and outside structural members is also possible and advantageous.

The invention claimed is:

1. A process for reinforcing a rigid plastic fuel tank comprising a wall defining an internal closed volume, the process comprising:

fixing a structural member to the wall of the tank outside the closed volume, in at least two fixation points located in two different portions of said wall where a deflection induced when the tank is filled with fuel, is low; and providing said structural member at least one contact point with the tank wall in a portion of said wall where the deflection is high compared to said low deflection, and over molding welding areas which are the fixation points of said structural member with a plastic weldable to the tank wall, wherein the structural member is made of a material which is more rigid than the plastic of the fuel tank.

2. The process according to claim 1, wherein there are five welding points located respectively substantially in the middle and in four corners of a lower tank wall or of an upper tank wall.

3. The process according to claim 1, wherein the structural member is shaped as a plate or as an assembly of bars or beams that form a frame.

4. A process for reinforcing a rigid plastic fuel tank comprising a wall defining an internal closed volume, the process comprising:
   fixing a structural member to the wall of the tank outside the closed volume, in at least two fixation points located in two different portions of said wall where a deflection induced when the tank is filled with fuel, is low; and
   providing said structural member at least one contact point with the tank wall in a portion of said wall where the deflection is high compared to said low deflection,
   wherein the tank comprises a pinch, and
wherein the structural member is a half shell made of sheet molding compounds (SMC) which is clipped on the pinch.

5. The process according to claim 4, further comprising:
   welding clips on the pinch at fixed locations in space relative to a welding equipment used to weld said clips, and clipping the half shell on these clips.

6. The process according to claim 4, wherein the at least one contact point is or the contact points are shaped as ribs located on the tank and on the structural member, said ribs having a matching shape and size.

7. The process according to claim 4, wherein the structural member is shaped as a plate or as an assembly of bars or beams that form a frame.

* * * * *